United States Patent
Kaidar et al.

(10) Patent No.: US 11,847,491 B1
(45) Date of Patent: Dec. 19, 2023

(54) LOW LATENCY EXECUTION OF A MACHINE LEARNING MODEL

(71) Applicant: HABANA LABS LTD., Caesarea (IL)

(72) Inventors: Oren Kaidar, Binyamina-Givat Ada (IL); Oded Gabbay, Raanana (IL)

(73) Assignee: HABANA LABS LTD., Caesarea (IL)

( * ) Notice: Subject to any disclaimer, the term of this patent is extended or adjusted under 35 U.S.C. 154(b) by 447 days.

(21) Appl. No.: 17/237,105

(22) Filed: Apr. 22, 2021

(51) Int. Cl.
  *G06F 9/50* (2006.01)
  *G06F 9/48* (2006.01)
  *G06N 20/00* (2019.01)

(52) U.S. Cl.
  CPC ............ *G06F 9/4881* (2013.01); *G06F 9/505* (2013.01); *G06F 9/5038* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 10,310,864 B2 | 6/2019 | Stanfill et al. | |
| 10,824,938 B2 | 11/2020 | Barik et al. | |
| 10,841,810 B2* | 11/2020 | O'Shea | G06F 9/4881 |
| 2019/0304568 A1* | 10/2019 | Wei | G16B 15/20 |
| 2020/0042362 A1 | 2/2020 | Cui et al. | |
| 2021/0097383 A1* | 4/2021 | Kaur | G06F 11/3466 |

* cited by examiner

*Primary Examiner* — Craig C Dorais
(74) *Attorney, Agent, or Firm* — KLIGLER & ASSOCIATES PATENT ATTORNEYS LTD

(57) ABSTRACT

An apparatus for Machine Learning (ML) processing includes computational engines and a Central Processing Unit (CPU). The CPU is configured to receive a work plan for processing one or more samples in accordance with a ML model represented by a corresponding ML graph. The work plan specifies jobs required for executing at least a subgraph of the ML graph by the computational engines, the at least subgraph includes multiple inputs, and is executable independently of other parts of the ML graph when the inputs are valid. The CPU is further configured to pre-process only a partial subset of the jobs in the work plan corresponding to the at least subgraph, for producing a group of pre-processed jobs that are required for executing part of the at least subgraph based on the one or more samples, and to submit the pre-processed jobs in the group to the computational engines for execution.

20 Claims, 3 Drawing Sheets

LOW LATENCY EXECUTION OF A MACHINE LEARNING MODEL

TECHNICAL FIELD

Embodiments described herein relate generally to machine learning, and particularly to methods and systems for low latency execution of machine learning models.

BACKGROUND

Machine Learning (ML) methods involve computational methods that build models based on sample data. The trained model can be used in processing unseen data.

Methods for ML processing are known in the art. For example, U.S. Pat. No. 10,824,938 describes a compute apparatus to perform machine learning operations, the apparatus comprising a decode unit to decode a single instruction into a decoded instruction, the decoded instruction to perform one or more machine learning operations, wherein the decode unit, based on parameters of the one or more machine learning operations, is to request a scheduler to schedule the one or more machine learning operations to one of an array of programmable compute units and a fixed function compute unit.

U.S. Patent Application Publication 2020/0042362 describes systems and methods for implementing a self-adaptive batch dataset partitioning control process, which is utilized in conjunction with a distributed deep learning model training process to optimize load balancing among a set of accelerator resources. An iterative batch size tuning process is configured to determine an optimal job partition ratio for partitioning mini-batch datasets into sub-batch datasets for processing by a set of hybrid accelerator resources, wherein the sub-batch datasets are partitioned into optimal batch sizes for processing by respective accelerator resources to minimize a time for completing the deep learning model training process.

SUMMARY

An embodiment that is described herein provides an apparatus for Machine Learning (ML) processing that includes one or more computational engines and a Central Processing Unit (CPU). The CPU is configured to receive a work plan for processing one or more samples in accordance with a ML model represented by a corresponding ML graph. The work plan specifies multiple jobs required for executing at least a subgraph of the ML graph by the computational engines, the at least subgraph includes multiple inputs, and is executable independently of other parts of the ML graph when the inputs are valid. The CPU is further configured to pre-process only a partial subset of the jobs in the work plan corresponding to the at least subgraph, for producing a group of pre-processed jobs that are required for executing part of the at least subgraph based on the one or more samples, and to submit the pre-processed jobs in the group to the computational engines for execution.

In some embodiments, the CPU includes multiple cores, and is configured to schedule the pre-processing of the jobs in the group by one or more of the cores, for minimizing a latency of submitting the pre-processed jobs in the group to the computational engines. In other embodiments, the CPU is configured to pre-process the jobs corresponding to the at least subgraph in multiple groups of the jobs. In yet other embodiments, the CPU is configured to pre-process second jobs specified in a second group among the multiple groups after pre-processing first jobs specified in a first group among the multiple groups, and a number of the second jobs in the second group is larger than a number of the first jobs in the first group.

In an embodiment, the CPU is configured to pre-process the jobs in the multiple groups in an execution order of the multiple groups derived from the work plan. In another embodiment, the work plan includes hints for dividing the jobs into the multiple groups, and the CPU is configured to divide the jobs into the multiple groups based on the hints. In yet another embodiment, the CPU is configured to monitor a CPU workload of the CPU, and to divide the jobs into the multiple groups also based on the CPU workload.

In some embodiments, the CPU is configured to process the one or more samples for training the ML model. In other embodiments, the CPU is configured to process the one or more samples for performing inference to the samples based on the ML model. In yet other embodiments, the CPU is configured to submit to a computational engine, based on the work plan, a program to be executed by the computational engine multiple times for multiple different jobs belonging to one or more respective groups.

There is additionally provided, in accordance with an embodiment that is described herein, a method for Machine Learning (ML) processing, including, receiving a work plan for processing one or more samples in accordance with a ML model represented by a corresponding ML graph, the work plan specifies multiple jobs required for executing at least a subgraph of the ML graph by one or more computational engines, and the at least subgraph includes multiple inputs, and is executable independently of other parts of the ML graph when the inputs are valid. Only a partial subset of the jobs in the work plan corresponding to the at least subgraph are pre-processed, for producing a group of pre-processed jobs that are required for executing part of the at least subgraph based on the one or more samples. The pre-processed jobs in the group are submitted to the computational engines for execution.

These and other embodiments will be more fully understood from the following detailed description of the embodiments thereof, taken together with the drawings in which:

DETAILED DESCRIPTION OF EMBODIMENTS

Overview

Figure 1:
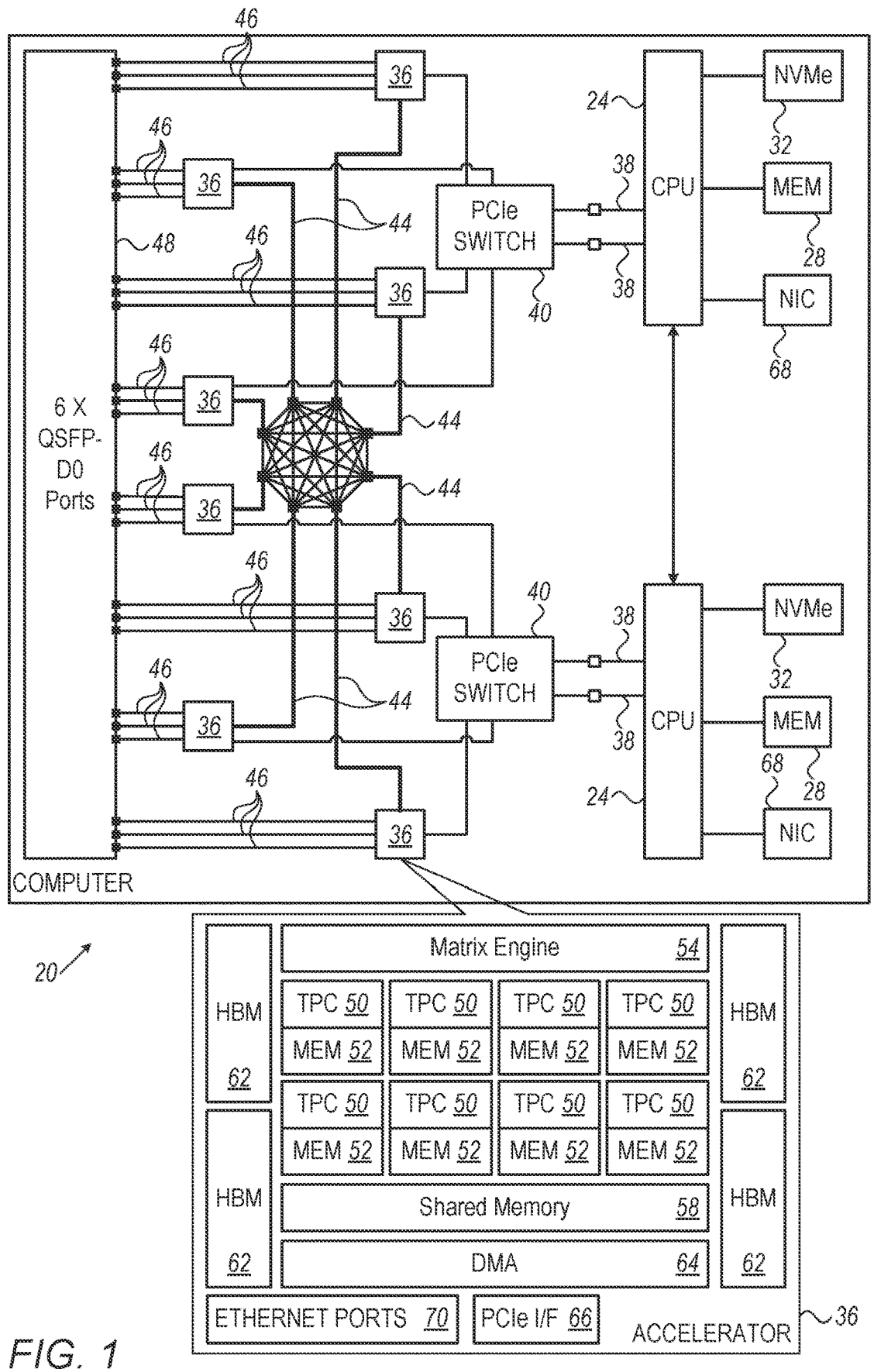
FIG. 1 is a block diagram that schematically illustrates a computer that supports low latency execution of a Machine Learning (ML) model, in accordance with an embodiment that is described herein.

Embodiments that are described herein provide methods and systems for reducing latency in processing a Machine Learning (ML) model.

In various ML applications a ML model is represented by a ML graph comprising nodes and edges. The nodes represent computational and other operations of the ML model, and the edges interconnect among the nodes in accordance with the ML model. Each individual node typically supports one or more primitive operations. The edges interconnecting the nodes determine the data flow across the ML graph. A system based on a ML model "learns" to perform a task by considering samples, generally without explicitly programming the system to perform the task.

In a ML graph, the nodes, edges, or both are typically assigned corresponding weights. The process of running a ML model over a large dataset of samples for determining the weights of the corresponding graph is referred to as a "training" process. The process of performing an intended task to an input sample using the trained model is referred to as an "inference" process. In the present context, running or executing a ML model means executing the corresponding ML graph.

Running a ML model typically involves execution in the nodes billions of operations of various types. For increasing the performance, e.g., in terms of speed and throughput, the execution of the underlying ML graph may be carried out using accelerators comprising dedicated computational engines designed for performing ML-related operations efficiently.

A ML graph typically requires certain pre-processing before being launched for execution in the accelerators. Such pre-processing comprises, for example, determining addressing information that the graph nodes use for accessing input data and for storing intermediate and output data. Other pre-processing may involve optimizations related to the usage of the computational engines in the accelerators.

Conventionally, the entire graph is first pre-processed and then launched for execution. Since the time of pre-processing increases with the complexity and size of the graph, the execution phase typically starts after a significant latency, during which the computational engines remain unutilized. The latency in starting execution increases the overall execution time of the ML graph and reduces the throughput.

In the disclosed embodiments, a host CPU gradually submits parts of a ML graph (or a subgraph thereof) for execution in the accelerator. Instead of pre-processing the entire ML graph prior to execution, the CPU submits for execution a partial part of the ML graph (or subgraph) that has been pre-processed. Consequently, the latency in launching the ML graph for execution by the accelerators reduces considerably. While the accelerators execute the first pre-processed part of the ML graph, the CPU pre-processes a subsequent part of the ML graph.

Consider an apparatus for Machine Learning (ML) processing, comprising a CPU and one or more computational engines. The CPU is configured to receive a work plan for processing one or more samples in accordance with a ML model represented by a corresponding ML graph, wherein the work plan specifies multiple jobs required for executing at least a subgraph of the ML graph by the computational engines. The at least subgraph comprises multiple inputs and is executable independently of other parts of the ML graph when the inputs are valid. The CPU is further configured to pre-process only a partial subset of the jobs in the work plan corresponding to the at least subgraph, for producing a group of pre-processed jobs that are required for executing part of the at least subgraph based on the one or more samples, and to submit the pre-processed jobs in the group to the computational engines for execution.

In some embodiments, the CPU comprises multiple cores, and is configured to schedule the pre-processing of the jobs in the group by one or more of the cores, for minimizing a latency of submitting the pre-processed jobs in the group to the computational engines.

In some embodiments the CPU is configured to pre-process the jobs corresponding to the at least subgraph in multiple groups of the jobs. The groups may comprise same or different sizes. In an example embodiment, the CPU is configured to pre-process second jobs specified in a second group among the multiple groups after pre-processing first jobs specified in a first group among the multiple groups, wherein a number of the second jobs in the second group is larger than a number of the first jobs in the first group. The CPU is configured to pre-process the jobs in the multiple groups in an execution order of the multiple groups derived from the work plan. In some embodiments, the work plan comprises hints for dividing the jobs into the multiple groups, and the CPU is configured to divide the jobs into the multiple groups based on the hints. In an embodiment, the CPU is configured to monitor a CPU workload of the CPU, and to divide the jobs into the multiple groups also based on the CPU workload.

The CPU may use the one or more samples for training the ML model and/or for performing inference to the samples based on the ML model.

In some embodiments, a common program can be used for executing multiple jobs. In such embodiments, the CPU is configured to submit to a computational engine, based on the work plan, a program to be executed by the computational engine multiple times for multiple different jobs belonging to one or more respective groups.

In the disclosed techniques, jobs that are required for processing an ML graph or a subgraph of the ML graph are divided into groups of jobs, to be pre-processed and submitted to the accelerators in an order compliant with the execution order of the underlying graph. While the accelerators execute the jobs in one group of jobs the CPU pre-processes the jobs in the next group in the execution order. Using the disclosed embodiments, the latency in starting the execution of the graph is controllable and can be minimized.

System Description

FIG. 1 is a block diagram that schematically illustrates a computer 20 that supports low latency execution of a Machine Learning (ML) model, in accordance with an embodiment that is described herein.

ML applications and services supported by computer 20 include, for example, image and gesture recognition in video, speech recognition, natural language processing and recommendation systems, to name a few.

In the present example, computer 20 comprises two host Central Processing Units (CPUs) 24, comprising any suitable processor. In some embodiments, CPU 24 comprises a multi-core processor comprising multiple processing cores. Each of CPUs 24 comprises a memory 28, e.g., a volatile memory, which may reside within or externally to the CPU. Each of CPUs 24 is further coupled to a Nonvolatile Memory (NVMe) 32.

The usage of multiple CPUs (e.g., two CPUs in this example) increases the ML processing throughput compared to using a single CPU. This configuration, however, is not mandatory, and in alternative configurations a single CPU can also be used.

Computer 20 comprises multiple accelerators 36 that are interconnected in an all-to-all connectivity configuration. In the present example, computer 20 comprises eight accelerators 36, each of which connects to multiple other accelerators. In FIG. 1, each accelerator connects to the other seven accelerators using a multi-link physical connection 44 comprising seven links, e.g., Ethernet links.

In FIG. 1, CPUs 24 communicate with accelerators 36 using Peripheral Component Interconnect Express (PCIe) links 38. Specifically, each CPU 24 is coupled using a PCIe switch 40 to four accelerators 36.

In the present example, each accelerator is coupled using links 46 to Quad Small Form-Factor Pluggable (QSFP) transceiver modules 48. In the present example, computer 20 comprises six QSFP modules, i.e., a total number of 24 transceivers serving the eight accelerators. Using the QSFP transceivers, accelerators 36 can communicate directly with other accelerators residing externally to computer 20, e.g., for the purpose of scaling out the ML capabilities.

The lower part of FIG. 1 depicts a block diagram of an example accelerator 36.

Accelerator 36 comprises one or more computational engines of any suitable type, for performing efficiently various mathematical and logical operations. In the example of FIG. 1, accelerator 36 comprises eight Tensor Processor Cores (TPCs) 50, each of which having a local memory 52. Accelerator 36 further comprises a matrix engine 54.

In some embodiments, TPC 50 is designed for high performance deep learning. For example, the TCP can handle efficiently matrix arithmetic such as, for example, matrix multiplication and matrix addition operations. Moreover, the TPC supports various floating point, integer, and unsigned integer data types. Matrix engine 54 supports various vector-matrix and matrix-matrix operations, including General Matrix Multiply (GEMM) operations of the form $C \leftarrow \alpha AB + \beta C$.

In some embodiments, accelerator 36 comprises an on-die shared memory 58 such as, for example, a Static RAM (SRAM). Moreover, the accelerator comprises multiple (four in this example) High Bandwidth Memory (HBM) devices 62, providing, e.g., 32 Giga Bytes of storage capacity and a bandwidth of 1 Tera Bytes per second. In an embodiment, accelerator 36 comprises a PCIe interface 66 for connecting to CPU 24 via PCIe switch 40, as described above.

In computer 20, each CPU 24 is coupled to a network adapter 68, e.g., a Network Interface Controller (NIC) 68 for connecting to any suitable communication network using suitable communication protocols (not shown). The communication network may comprise, for example, an Ethernet network with the Transmission Control Protocol (TCP) or the User Datagram Protocol (UDP) transport layer.

In some embodiments, accelerator 36 comprises one or more on-chip RDMA over Converged Ethernet (RoCE) engines. The RoCE engines are important, e.g., for inter-accelerator communication during the training of a ML model. RDMA operations are supported by the accelerator using Direct Memory Access (DMA) 64. In some embodiments, using RDMA, NICs 68 retrieve samples from a remote storage, and transfer the retrieved samples directly to shared memory 58 without involving CPUs 24.

Accelerator 36 comprises multiple Ethernet ports 70, for connecting to QSFP transceivers 48 using links 46, as described above. For example, the accelerator may comprise ten Ethernet ports (70) of 100 Gb Ethernet per port, in an embodiment. Alternatively, other numbers of ports operating at other suitable data rates can also be used. Ports 70 are designed to scale out the inter-accelerator communication by integrating a complete communication engine on-die (e.g., ROcE engines as described above).

The computer (20) and accelerator (36) configurations shown in FIG. 1 are example configurations, which are chosen purely for the sake of conceptual clarity. In alternative embodiments, any other computer and accelerator configurations can also be used. Elements that are not necessary for understanding the principles of the present invention, such as various interfaces, addressing circuits, timing and sequencing circuits and debugging circuits, have been omitted from the figure for clarity.

Some elements of accelerator 36, such as TPCs 50 and matrix engine 54, may be implemented in hardware, e.g., in one or more Application-Specific Integrated Circuits (ASICs) or FPGAs. Additionally or alternatively, accelerator 36 can be implemented using software, or using a combination of hardware and software elements.

Memory 28 may comprise any suitable memory, e.g., a Random-Access Memory (RAM) such as, for example, a suitable Double Data Rate Synchronous Dynamic RAM (DDR SDRAM) memory. Memory 32 may comprise any suitable nonvolatile type of memory, such as, for example, a Flash memory.

In some embodiments, some of the functions of computer 20, e.g., functions of CPU 24 and accelerator 36, may be carried out by general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

Methods for Low Latency ML Graph Execution

Figure 2:
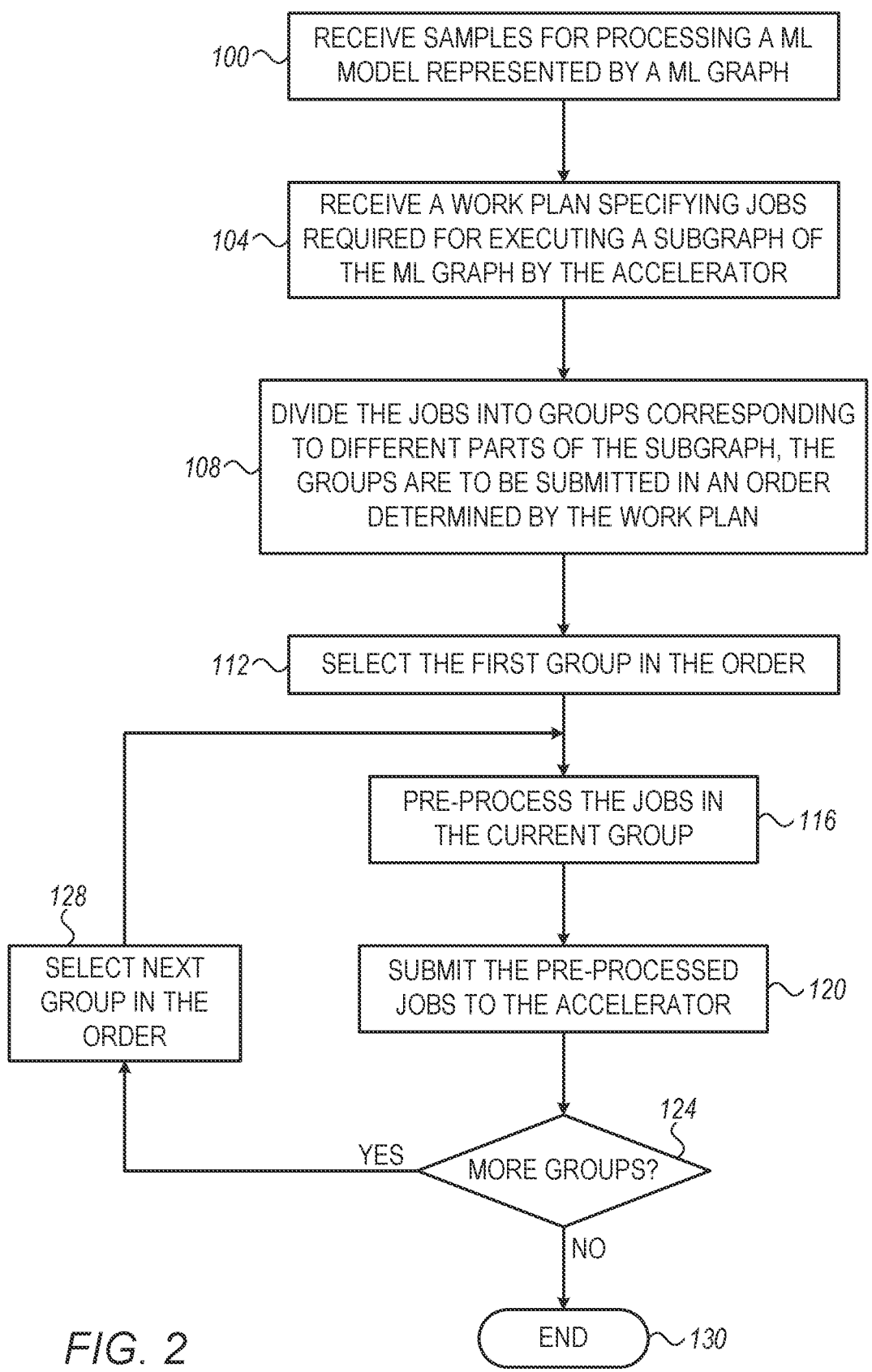
FIG. 2 is a flow chart that schematically illustrates a method for low latency execution of a ML model, in accordance with an embodiment that is described herein.

FIG. 2 is a flow chart that schematically illustrates a method for low latency execution of a ML model, in accordance with an embodiment that is described herein. The method will be described as executed by CPU 24 of computer 20.

In describing the method it is assumed that CPU 24 executes a ML graph using an accelerator 36 having one or more computational engines, e.g., selected from among TPCs 50 and Matrix engine 54. The method in applicable, however, in any other suitable computer and accelerators configuration.

The method begins with CPU 24 receiving samples for running a ML model represented by a ML graph, at a sample reception step 100. In some embodiments, the samples may be stored in an external storage and fetched to computer 20 using NICs 68. The samples are typically read in batches of multiple samples per batch. In some embodiments, the samples are read via the NIC directly to a memory of the accelerator (e.g., shared memory 58) using the RoCE protocol, as described above.

The samples read at step 100 may be of any suitable type, such as images, for example. Samples of different types may be processed using different ML models and corresponding ML graphs.

At a work plan reception step 104, the CPU receives a work plan specifying jobs required for executing a subgraph of the ML graph by the accelerator. The work plan is typically determined by a graph compiler program based on the underlying ML model. The work plan typically comprises multiple smaller work plans assigned to respective computational engines in the accelerator.

At a work division step 108, the CPU divides the jobs of the work plan into groups corresponding to different parts of the subgraph, the groups are to be submitted in a certain execution order, determined by the work plan. In some embodiments, the work plan contains hints that CPU 24 uses in dividing the jobs into the groups. The CPU may also divide the jobs into the groups based on the workload of the CPU, in an embodiment.

At a first group selection step 112, the CPU selects the first group of jobs to be executed. At a pre-processing step 116, the CPU pre-processes the jobs in the selected group, and at a submission step 120, the CPU submits the pre-processed jobs to the accelerator for execution.

At a loop termination step 124, the CPU checks whether the work plan comprises groups that are not yet processed, and if so, proceeds to a subsequent group selection step 128, to select a subsequent group of jobs in accordance with the execution order, and loops back to step 116 to pre-process the jobs in the selected group.

When at step 124 all of the groups have been processed, the loop ends, and the method terminates.

At step 108 above, the CPU may divide the jobs into groups in various ways. In one embodiment, the groups comprise the same number of jobs per group. In another embodiment, different groups may comprise different respective number of jobs.

In some embodiments, the duration of pre-processing the jobs in a group is shorter than the execution time of these jobs, and therefore the CPU may assign to a given group a number of jobs larger than the number of jobs in a previously submitted group. In some embodiments, the CPU reduces the overall execution time of the subgraph by dividing the jobs of the subgraph into groups so that the number of jobs per group increases along the ordered sequence of the groups. In such embodiments, the first group starts execution with some (reduced) latency, whereas all other groups are executed with zero (or very short) latency.

In an example embodiment, the CPU divides the jobs into groups so that the number of jobs per group increases linearly along the ordered sequence of the groups. For example, let N(n) denote the number of jobs assigned to the $n^{th}$ group in the execution order. Further let 'A' denote the number of jobs in the first group and let 'B' denote the rate of increasing the number of jobs per group. In this example, N(n) is given by the equation N(n)=A+nB. For example, when A=10 and B=20, the numbers of jobs per group are given by 10, 30, 50 and so on.

Example Pre-Processing and Submission of Jobs for Ml Subgraph Execution

Figure 3:
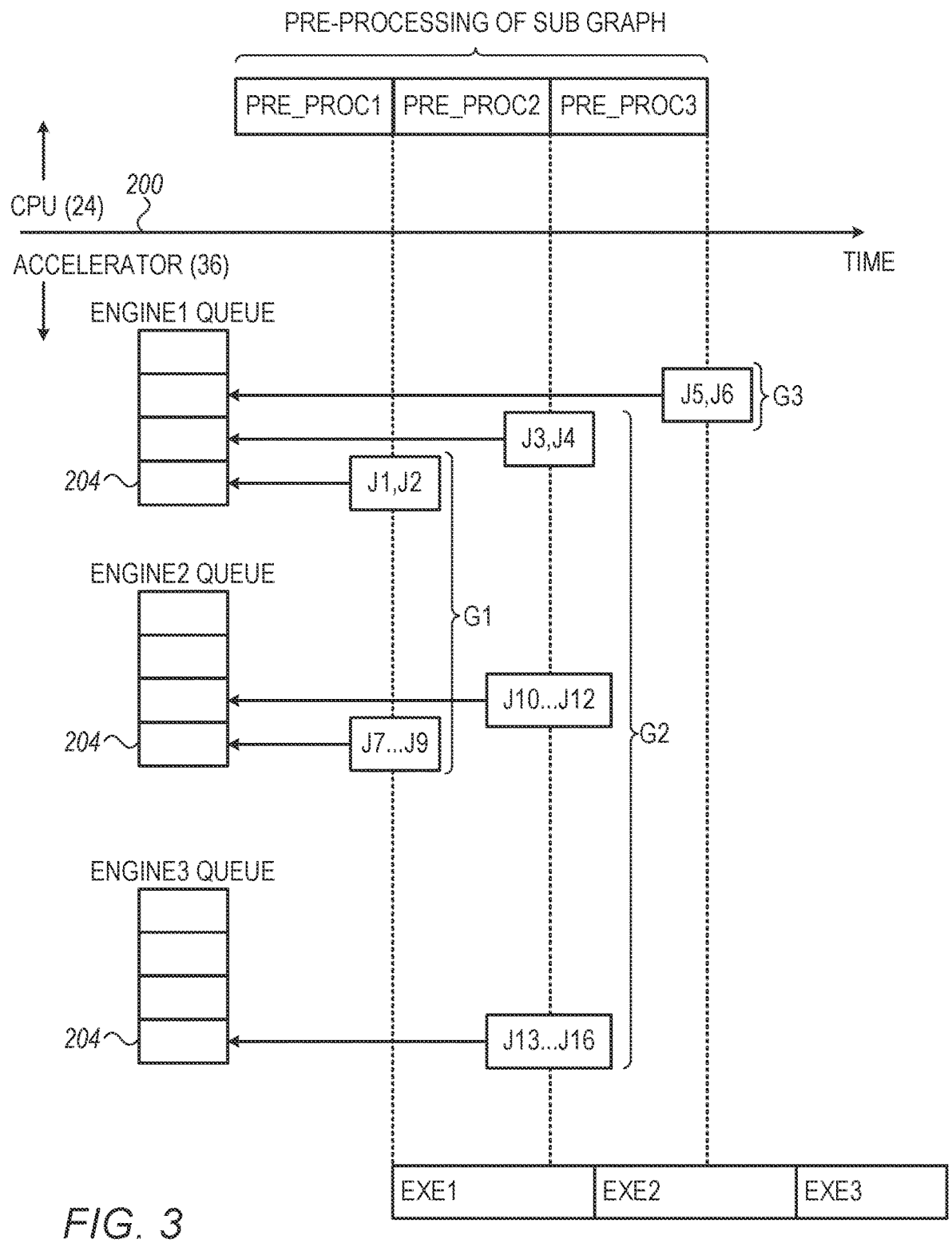
FIG. 3 is a diagram that schematically illustrates efficient pre-processing and submission of jobs for subgraph execution by computational engines, in accordance with an embodiment that is described herein.

FIG. 3 is a diagram that schematically illustrates efficient pre-processing and submission of jobs for subgraph execution by computational engines, in accordance with an embodiment that is described herein.

FIG. 3, depicts operational domains of CPU 24 and accelerator 36, above and below a time axis 200, respectively. FIG. 3 depicts in the accelerator domain, three queues 204 of accelerator 36, serving three respective computational engines, e.g., TPCs 50. In the figure, queues 204 are denoted ENGINE1 queue, ENGINE2 queue and ENGINE3 queue, corresponding to respective computational engines denoted Engine1, Engine2 and Engine3 (not shown).

In the present example, CPU 24 is required to run a subgraph based on a work plan that comprises 16 jobs denoted J1 . . . J16. In accordance with the underlying work plan, jobs J1 . . . J6 are assigned for execution by Engine1, jobs J7 . . . J12 are assigned for execution by Engine2, and J13 . . . J16 are assigned for execution by Engine3. Further according to the work plan, the jobs are divided into three groups of jobs, denoted G1, G2 and G3. G1 contains J1 and J2 of Engine1, and J7 . . . J9 of Engine2. G2 contains J3 and J4 of Engine1, J10 . . . J12 of Engine2, and J13 . . . J16 of Engine3. G3 contains J5 and J6 of Engine1.

In executing the subgraph, CPU 24 performs three preprocessing tasks denoted PRE_PROC1, PRE_PROC2 and PRE_PROC3 for pre-processing the jobs in the respective groups G1, G2 and G3. When PRE_PROC1 ends, the CPU submits the jobs of group G1 to ENGINE1 and ENGINE2 queues. When PRE_PROC2 ends, the CPU submits the jobs of G2 to respective ENGINE1, ENGINE2 and ENGINE3 queues, and when PRE_PROC3 ends, the CPU submits the jobs of G3 to ENGINE1 queue.

The execution periods corresponding to the three submission operations are denoted respectively EXE1, EXE2 and EXE3. During EXE1, Engine1 and Engin2 execute the jobs of G1, during EXE2, Engine1, angine2 and Engine3 execute the jobs of G2, and during EXE3, Engine1 executes the jobs of G3.

As shown in the figure, the first execution period EXE1 starts at a latency caused by PRE_PROC1 alone. It should be noted, that in conventional methods, in which all preprocessing is carried out before execution, the latency in starting execution would be the accumulated duration of PRE_PROC1, PRE_PROC2 and PRE_PROC3, which is much longer than PRE_PROC1 alone.

In some embodiments, the work plan comprises a program that is submitted to an accelerator once, and executed multiple times for multiple different jobs. In such embodiments, the CPU is configured to submit to a computational engine, based on the work plan, a program to be executed by the computational engine multiple times for multiple different jobs belonging to one or more respective groups.

The embodiments described herein are given by way of example, and other suitable embodiments can also be used.

Although the embodiments described herein mainly address machine learning training, the methods and systems described herein can also be used in other applications, such as in machine learning inference, and in machine learning pipelines (e.g., using the MediaPipe or other open source).

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus for Machine Learning (ML) processing, comprising:
one or more computational engines; and
a Central Processing Unit (CPU), configured to:
receive a work plan for processing one or more samples in accordance with a ML model represented by a corresponding ML graph, wherein the work plan specifies multiple jobs required for executing at least a subgraph of the ML graph by the computational engines, wherein the at least subgraph comprises multiple inputs, and is executable independently of other parts of the ML graph when the inputs are valid;

pre-process only a partial subset of the jobs in the work plan corresponding to the at least subgraph, for producing a group of pre-processed jobs that are required for executing part of the at least subgraph based on the one or more samples; and submit the pre-processed jobs in the group to the computational engines for execution.

2. The apparatus according to claim 1, wherein the CPU comprises multiple cores, and is configured to schedule the pre-processing of the jobs in the group by one or more of the cores, for minimizing a latency of submitting the pre-processed jobs in the group to the computational engines.

3. The apparatus according to claim 1, wherein the CPU is configured to pre-process the jobs corresponding to the at least subgraph in multiple groups of the jobs.

4. The apparatus according to claim 3, wherein the CPU is configured to pre-process second jobs specified in a second group among the multiple groups after pre-processing first jobs specified in a first group among the multiple groups, wherein a number of the second jobs in the second group is larger than a number of the first jobs in the first group.

5. The apparatus according to claim 3, wherein the CPU is configured to pre-process the jobs in the multiple groups in an execution order of the multiple groups derived from the work plan.

6. The apparatus according to claim 3, wherein the work plan comprises hints for dividing the jobs into the multiple groups, and wherein the CPU is configured to divide the jobs into the multiple groups based on the hints.

7. The apparatus according to claim 6, wherein the CPU is configured to monitor a CPU workload of the CPU, and to divide the jobs into the multiple groups also based on the CPU workload.

8. The apparatus according to claim 1, wherein the CPU is configured to process the one or more samples for training the ML model.

9. The apparatus according to claim 1, wherein the CPU is configured to process the one or more samples for performing inference to the samples based on the ML model.

10. The apparatus according to claim 1, wherein the CPU is configured to submit to a computational engine, based on the work plan, a program to be executed by the computational engine multiple times for multiple different jobs belonging to one or more respective groups.

11. A method for Machine Learning (ML) processing, comprising:

receiving a work plan for processing one or more samples in accordance with a ML model represented by a corresponding ML graph, wherein the work plan specifies multiple jobs required for executing at least a subgraph of the ML graph by one or more computational engines, wherein the at least subgraph comprises multiple inputs, and is executable independently of other parts of the ML graph when the inputs are valid;

pre-processing only a partial subset of the jobs in the work plan corresponding to the at least subgraph, for producing a group of pre-processed jobs that are required for executing part of the at least subgraph based on the one or more samples; and submitting the pre-processed jobs in the group to the computational engines for execution.

12. The method according to claim 11, wherein the CPU comprises multiple cores, and comprising scheduling the pre-processing of the jobs in the group by one or more of the cores, for minimizing a latency of submitting the pre-processed jobs in the group to the computational engines.

13. The method according to claim 11, wherein pre-processing the jobs comprises pre-processing the jobs corresponding to the at least subgraph in multiple groups of the jobs.

14. The method according to claim 13, wherein pre-processing the jobs comprises pre-processing second jobs specified in a second group among the multiple groups after pre-processing first jobs specified in a first group among the multiple groups, wherein a number of the second jobs in the second group is larger than a number of the first jobs in the first group.

15. The method according to claim 13, wherein pre-processing the jobs comprises pre-processing the jobs in the multiple groups in an execution order of the multiple groups derived from the work plan.

16. The method according to claim 13, wherein the work plan comprises hints for dividing the jobs into the multiple groups, and wherein pre-processing the jobs comprises dividing the jobs into the multiple groups based on the hints.

17. The method according to claim 16, wherein dividing the jobs comprises monitoring a CPU workload of the CPU, and dividing the jobs into the multiple groups also based on the CPU workload.

18. The method according to claim 11, wherein receiving the work plan comprises receiving the work plan for processing the one or more samples for training the ML model.

19. The method according to claim 11, wherein receiving the work plan comprises receiving the work plan for processing the one or more samples for performing inference to the samples based on the ML model.

20. The method according to claim 11, wherein submitting the pre-processed jobs comprises submitting to a computational engine, based on the work plan, a program to be executed by the computational engine multiple times for multiple different jobs belonging to one or more respective groups.

* * * * *